United States Patent
Beck

[11] Patent Number: 5,310,253
[45] Date of Patent: May 10, 1994

[54] BRAKING PRESSURE CONTROL DEVICE

[75] Inventor: Erhard Beck, Weilburg, Fed. Rep. of Germany

[73] Assignee: Alfred Teves GmbH, Frankfurt Am Main, Fed. Rep. of Germany

[21] Appl. No.: 910,322

[22] PCT Filed: Aug. 26, 1991

[86] PCT No.: PCT/EP91/01621
§ 371 Date: Jul. 16, 1992
§ 102(e) Date: Jul. 16, 1992

[87] PCT Pub. No.: WO92/08632
PCT Pub. Date: May 29, 1992

[30] Foreign Application Priority Data

Nov. 16, 1990 [DE] Fed. Rep. of Germany ....... 4036583

[51] Int. Cl.⁵ ................ B60K 28/16; B60T 8/32; B60T 8/40
[52] U.S. Cl. ................ 303/113.1; 303/116.1; 303/900; 303/901; 303/119.1; 303/117.1
[58] Field of Search ........ 303/116.1, 900, 901, 303/116.2, 119.1, 113.2, 113.1, 10–12, 117.1, 116.3, 116.4, 115.1, 115.4, 115.5, 68–69, 9.62, 9.75, 113.5; 188/181 R, 181 A, 349, 181 C

[56] References Cited

U.S. PATENT DOCUMENTS

| | | | |
|---|---|---|---|
| 4,775,193 | 10/1988 | Farr et al. | 303/9.75 |
| 4,915,459 | 4/1990 | Hashida et al. | 303/119.1 |
| 4,941,712 | 7/1990 | Hirobe | 303/115.4 |
| 5,026,123 | 6/1991 | Nokubo et al. | 303/117.1 |
| 5,096,269 | 3/1992 | Pickenhahn | 303/115.4 |
| 5,098,173 | 3/1992 | Beck et al. | 303/116.1 |
| 5,176,432 | 1/1993 | Burgdorf et al. | 303/900 X |
| 5,213,399 | 5/1993 | Burgdorf et al. | 303/116.2 X |

FOREIGN PATENT DOCUMENTS

| | | | |
|---|---|---|---|
| 0202845 | 11/1986 | European Pat. Off. | |
| 0242132 | 10/1987 | European Pat. Off. | |
| 0353635 | 2/1990 | European Pat. Off. | 303/117.1 |
| 0361336 | 4/1990 | European Pat. Off. | |
| 3844126 | 7/1989 | Fed. Rep. of Germany | |
| 3827367 | 2/1990 | Fed. Rep. of Germany | |
| 3838571 | 5/1990 | Fed. Rep. of Germany | |

Primary Examiner—Douglas C. Butler
Attorney, Agent, or Firm—Robert P. Seitter; J. Gordon Lewis

[57] ABSTRACT

A braking pressure control device is described for an automatic wheel brake system equipped with an antilock control system (ABS) and/or a traction slip control system (TSC). A controlled pressure reduction phase with a minimized residual pressure in the wheel brake is achieved by the control device, which includes, an inner piston (1) guided within an outer piston (4) displaceable in relation to a valve housing (2) and furnished with a piston step (3), while a spring fixed in the outer piston (4) urges the inner piston (1) towards a valve closure member (7) mounted within the outer piston (4) and movable onto an inlet valve seat (15), the inner piston (1) holding the closure element (7) off the seat (15) until the outlet valve (21) is opened. The outer piston (4) then modulates the outflow by movement of a control edge (19) against the force of a control spring (8).

9 Claims, 1 Drawing Sheet

BRAKING PRESSURE CONTROL DEVICE

BACKGROUND OF THE INVENTION

The present invention relates to a braking pressure control device, in particular for automotive vehicles equipped with an anti-lock control system (ABS) and/or a traction slip control system (TSC).

The braking pressure control device of this type tends to form a residual pressure in the wheel brake when operating in the low-temperature range during the slip-controlled pressure reduction phase due to the viscosity of the brake fluid. Because of the unsatisfactory pressure relief of the wheel brake, in particular when disc brakes are used, the wheel acceleration ability may be impaired undesirably after opening of the outlet valve, since the pressure accumulated in front of the opened outlet valve may react on the piston in the wheel brake cylinder under the action of the auxiliary pressure pump during slip control. Also, the long control spring required due to the relatively high pressure to be reduced causes a related delayed response behavior during braking pressure control.

Therefore, it is an object of the present invention to improve upon a braking pressure control device of the type referred to in order to overcome the disadvantages described and to realize in a cost-saving fashion a slip-controlled pressure reduction phase with reduced formation of residual pressure in the wheel brake.

SUMMARY OF THE INVENTION

This object is achieved according to the present invention by a brake pressure control device including a stepped diameter outer piston with an inner piston slidable within the outer piston. An inlet valve is mounted in the outer piston which is held opon by the inner piston until the outlet valve is opened, the inlet valve then closing. Thereafter the outer piston acts as a modulator of outflow from the brake cylinder, acted on by a control spring and wheel cylinder pressure.

Hence a braking pressure control device is provided by a surprisingly simple arrangement which permits favorable pressure reduction gradients by way of a slidable piston furnished with a piston step subjected to the prevailing wheel cylinder pressure, while a corresponding design of the control spring safeguards a considerably improved control of the pressure fluid flow even in low-temperature operation.

In a preferred embodiment of the invention, the inlet valve has a closure member in direct contact with a first spring of low stiffness, while a second spring of greater stiffness acts on the inner piston in opposition to the first spring.

It is provided according to another aspect of the invention that the piston step on the larger front-face outer piston surface is acted upon by a control spring, movable into abutment on the valve housing. This accomplishes pressure reduction gradients which are favorable in terms of control technology, and an almost complete pressure relief of the wheel brake during the pressure decrease phase is permitted without regard to the temperature of the pressure fluid.

In order to enable modulation of the pressure fluid in correspondence with the wheel cylinder pressure, the channel connecting to the wheel brake is suitably arranged in the area of transition from the large diameter of the piston step to the smaller diameter.

To safeguard a functional control of the pressure fluid variation between the wheel brake and the outlet valve, the connecting channel emanating from the master cylinder is disposed in the area of the large diameter of the piston step.

DESCRIPTION OF THE DRAWINGS

The present invention will be explained hereinbelow by way of an embodiment according to the Figure, which is a fragmentary sectional view of a brake pressure control device according to the invention together with a diagrammatic representation of associated brake system components.

DETAILED DESCRIPTION

Figure 1:
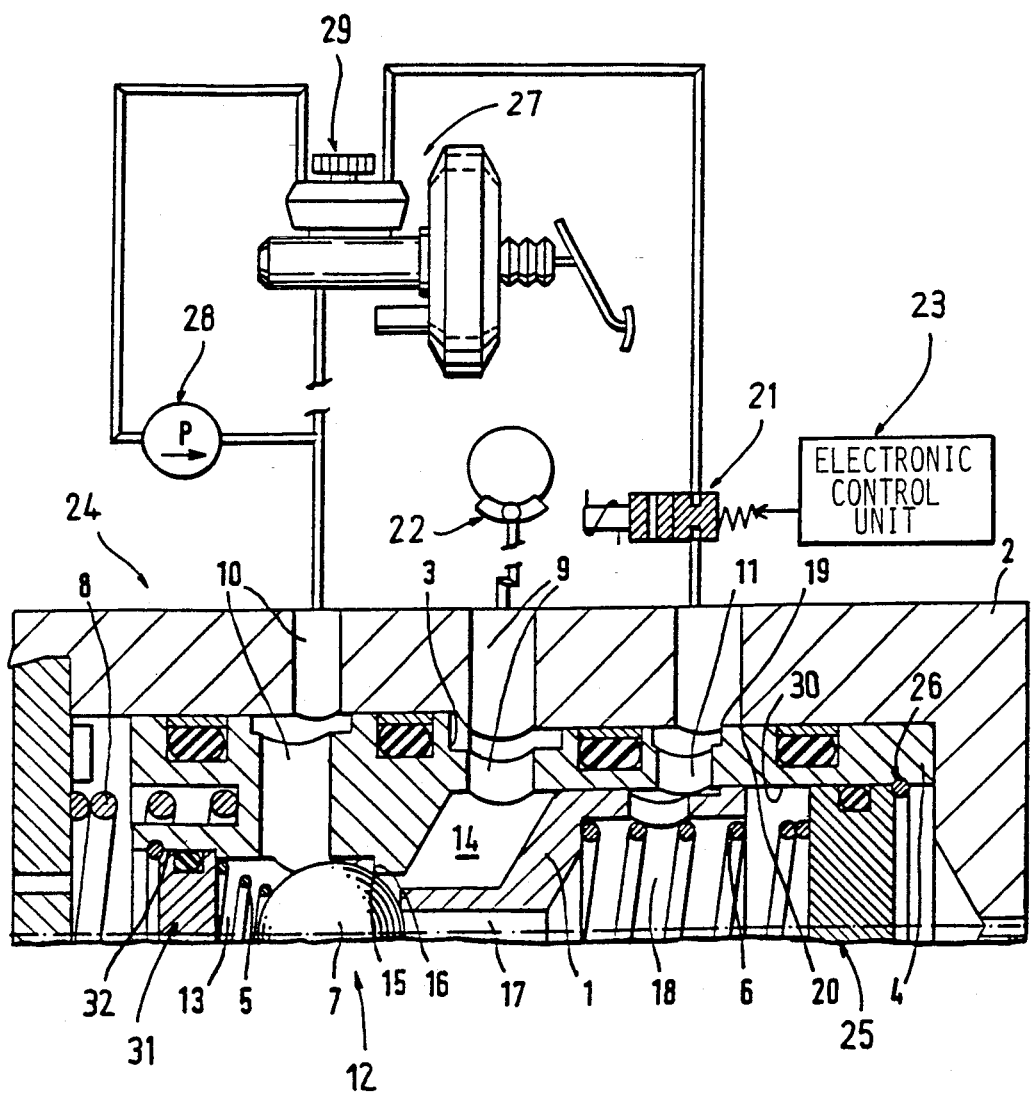

Referring to the Figure, the brake pressure control device 24 according to the present invention is utilized as part of a hydraulically operated automotive wheel brake system including at least one wheel brake cylinder 22, a brake pedal operated master cylinder 27, and a motor driven pump 28. The master cylinder 27 and pump 28 generate hydraulic pressure applied to the wheel cylinder 22 via an inlet valve 12 in the control device 24, an electronic control unit 23 energizing an outlet valve 21 which is thereby opened to reduce the pressure in the wheel cylinder 22 at the beginning of a control cycle, in the well known manner.

The embodiment of the brake pressure control device shown in the Figure comprises inner and outer pistons 1, 4 which are arranged nested together and axially movable relative to one another and within a valve housing 2. According to the embodiment of the Figure, the outer second piston 4 is a stepped diameter piston. The outer piston 4 has a control or regulating edge 19 formed in its peripheral surface, which, together with a radially arranged control edge on the valve housing 2, establishes a variable cross-section area to the radially extending port 11 for connecting the channel 15 to the outlet valve 21.

The connecting channel 9 leading to the wheel cylinder 22 extends through both the valve housing 2 and the stepped area of the outer piston 4 in a joint radial plane. The large end face of the outer piston 4 is subjected to the pressure of a control spring 8 in the area of the piston step 3, whereby the outer piston 4 assumes a defined basic position in abutment on the valve housing 2 when the brake is non-activated The inlet valve 12 is open in the normal braking mode. A second spring 6 arranged concentrically in relation to the moved parts urges the inner piston 1 and an engaged ball closure member 7 to the left against the force of a first spring 5, which is less stiff than the second spring 6 in order to open a valve seat 15 and hence the inlet valve 12. This opened position is preserved by the fluid column between the closed outlet valve 21 and the inner piston 1 in the normal braking mode. Free flow of the pressure fluid is thus enabled from a master cylinder-pump pressure chamber 13 incorporated in the outer piston 4 to the wheel cylinder pressure chamber 14 disposed between the inner and outer pistons 1, 4, and hence to the wheel brake cylinder 22.

The second spring 6 is seated on a sealed closure 25 in an outer piston bore held against a stop 26 on the outer piston 4 by the pressure in outlet chamber 18. The first spring 5 is seated on a second closure disc 31 in a smaller diameter bore 32 in the outer piston 4 receiving the inlet valve ball closure element 7.

In the anti-lock control mode, the outlet valve 21 comprising an electromagnetically actuatable valve closed in its deenergized state (SG-valve), will be opened in the pressure reduction phase, in response to an output signal from the electronic control unit 23 of the anti-lock brake system, to allow outflow of hydraulic fluid to an unpressurized reservoir 29 or other low pressure region in the system.

The connection to the outlet valve 21 is established by valve seat 15 and a line connecting thereto. The inner piston 1 moves to the right against the force of the second spring 6 due to the difference in pressure between the wheel brake cylinder 22 and the outlet valve 21. The ball closure element 7, biased by the first spring 5 closes, seating on the valve seat 15.

A throttle 16 becomes active which is formed by a recess in the valve seat 15. With the exception of the throttle cross-section, the axial channel 17 in the inner piston 1 which can constitute a connection between the master cylinder-pressure chamber 13 and the outlet chamber 18 is closed. The outer piston 4 moves against the control spring 8 in dependence on the wheel cylinder pressure active on the annular surface of the piston step 3, and displaces to the left as viewed in the drawing. The control edge 19 on the outer piston 4 automatically overrides the control edge 20 disposed on the valve housing 12. This action controls the return flow exiting via the outlet valve 21.

Consequently, the control edges 19, 20 of the outer piston 4 and of the valve housing 2 are brought to overlap each other in dependence on the wheel brake pressure prevailing on the piston step 3, so that an exact modulation of the wheel braking pressure is ensured to effect a complete evacuation of the wheel brake cylinder 22. It is hereby possible to realize a pressure reduction in the presence of higher wheel pressures which is an advantage in terms of control technology.

Further, a reduction of the relatively high residual wheel pressure which is considerably improved at low temperatures results from the use of special materials, for instance shape-memory alloys or bimetals for the control spring 8 which are responsive to temperature changes.

I claim:

1. A braking pressure control device for an automotive vehicle wheel brake system having an automatic control operating with hydraulic fluid, said wheel brake system including a master cylinder, at least one wheel brake cylinder, at least one normally open inlet valve controlling communication of said master cylinder and pump with said wheel cylinder and at least one normally closed outlet valve for said wheel cylinder allowing outflow of hydraulic fluid from said wheel cylinder to a low pressure region in the system, at least one motor-driven pump for generating pressurized hydraulic fluid, an electronic control unit, said pressure control device including means responsive to opening of said outlet valve and a resulting pressure drop in the outlet line of said wheel cylinder to close said inlet valve, said braking pressure control device comprising a valve housing, an inner piston, an outer stepped diameter piston having a larger diameter portion and a smaller diameter portion, said inner piston slidable within said outer piston, said outer piston slidable in said valve housing, said outer piston stepped diameter forming a piston step; a master cylinder pressure chamber defined in said outer piston with channels in said housing and said outer piston enabling pressurization of said master cylinder pressure chamber with hydraulic fluid from said pump or master cylinder, said inlet valve including an inlet valve seat formed in said outer piston adjacent said master cylinder pressure chamber and an inlet valve closure element carried within said outer piston in said master cylinder pressure chamber to be movable onto and off said valve seat, a spring urging said closure element onto said valve sat, a wheel cylinder pressure chamber defined in said outer piston and channel in said housing and outer piston allowing a fluid connection to said wheel cylinder, pressure in said wheel cylinder chamber exerted on said outer piston step, said master cylinder pressure chamber communicating with said wheel cylinder pressure chamber through said valve seat with said inlet valve closure element moved off said valve seat, an outlet chamber in said inner piston and channels in said valve housing, outer piston and inner piston allowing connection to a low pressure region of said system via said outlet valve, said channels in said housing and outer piston forming a control edge upon movement of said outer piston from an abutting position against said housing; a portion of said inner piston engagable with said inlet valve closure element upon movement towards said closure element to move said valve closure element off said valve seat, said inner piston portion configured to allow flow out of said wheel cylinder pressure chamber through said valve seat and into said wheel cylinder pressure chamber, an inner channel in said inner piston communicating said wheel cylinder pressure chamber with said outlet chamber with said inner piston portion moved out of engagement with said closure element, a spring in said outer piston urging said inner piston portion into engagement with said closure element, a control spring in said housing acting on said outer piston urging said outer piston towards said abutting position against said wheel cylinder chamber, pressure on said step in said outer piston directed so as to urge said outer piston away from said position abutting said housing.

2. A braking pressure control device as claimed in claim 1, wherein said valve closure element is mounted within a larger diameter of said outer piston.

3. A braking pressure control device as claimed in claim 1 wherein said spring urging sd inner piston towards said closure element is of greater stiffness than said spring urging said valve closure element onto said valve seat.

4. A braking pressure control device as claimed in claim 1, where in said control spring is made of a material having a changing spring characteristic in response to temperature changes.

5. A braking pressure control device as claimed in claim 1 wherein said connecting channel from said wheel cylinder pressure chamber is located in an area of transition from said large diameter portion to said small diameter portion of said outer piston.

6. A braking pressure control device according to claim 5 further including a second aligned bore in said outer piston of smaller diameter than said first mentioned bore receiving said inlet valve closure element, a second closure disc fixed at an end of said second bore remote from said first mentioned bore, said spring acting on said inlet valve closure element seated against said second closure disc.

7. A braking pressure control device as claimed in claim 1 wherein said connecting channel leading to said master cylinder pressure chamber extends through said large diameter portion of said outer piston.

8. A braking pressure control device according to claim 1 further including a bore in said outer piston receiving said inner piston, a closure disc fixed at one end of said bore sealing said bore, said spring acting on said inner piston compressed between said closure disc and said inner piston.

9. A braking pressure control device for an automotive vehicle wheel brake system having an automatic control operating with hydraulic fluid, said wheel brake system including a master cylinder, at least one wheel brake cylinder, at least one normally open inlet valve controlling communication of said master cylinder and pump with said wheel cylinder and at least one normally closed outlet valve for said wheel cylinder allowing outflow of hydraulic fluid from said wheel cylinder to allow pressure region in the system, at least one motor-driven pump for generating pressurized hydraulic fluid, an electronic control unit, said pressure control device including means responsive to opening of said outlet valve and a resulting pressure drop in the outlet line of said wheel cylinder to close said inlet valve, said braking pressure control device comprising:

a valve housing;

an inner piston;

an outer piston, said inner piston slidable within said outer piston, said outer piston slidable in said valve housing;

a master cylinder pressure chamber defined in said outer piston with openings in said housing and said outer piston enabling pressurization of said master cylinder pressure chamber with hydraulic fluid from said pump or said master cylinder;

said inlet valve including an inlet valve seat formed in said outer piston adjacent said master cylinder pressure chamber and an inlet valve closure element carried within said outer piston in said master cylinder pressure chamber to be movable onto and off said valve seat;

a spring urging said closure element onto said valve seat;

a wheel cylinder pressure chamber defined in said outer piston and an opening through said housing and outer piston allowing a fluid connection of said wheel cylinder pressure chamber to said wheel cylinder;

said master cylinder pressure chamber communicating with said wheel cylinder pressure chamber through said valve seat with said inlet valve closure element moved off said valve seat;

an outlet chamber in said inner piston and an opening in each of said valve housing, said outer piston and said inner piston allowing a fluid connection to a low pressure region of said system via said outlet valve;

said respective openings in said housing and outer piston forming a control edge upon movement towards said closure element to move said valve closure element off said valve seat, said inner piston portion configured to allow flow out of said wheel cylinder pressure chamber through said valve seat and into said wheel cylinder pressure chamber, an inner channel in said inner piston communicating said wheel cylinder pressure chamber with said outlet chamber, with said inner piston portion withdrawn out of engagement with said closure element and said closure element deposited on said valve seat;

a spring in said outer piston urging said inner piston portion into engagement with said closing element.

* * * * *